Dec. 24, 1929.  A. F. DEBELACK  1,741,014
BABY CONVEYANCE
Filed July 2, 1928  2 Sheets-Sheet 2
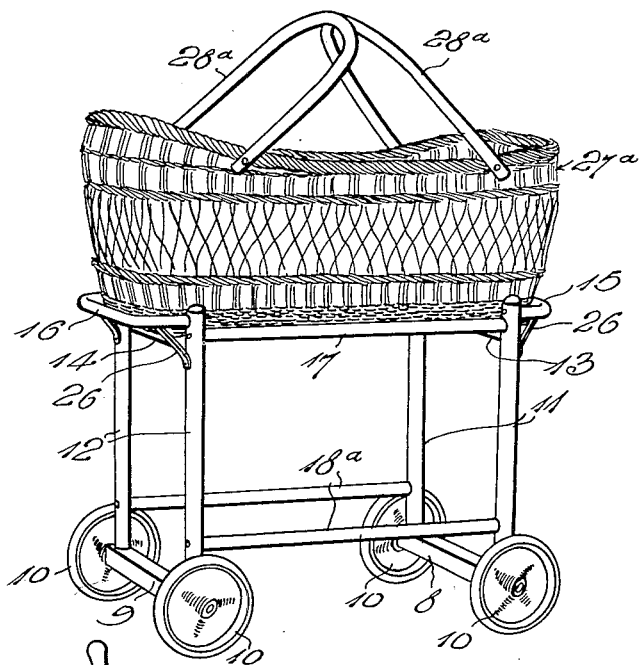
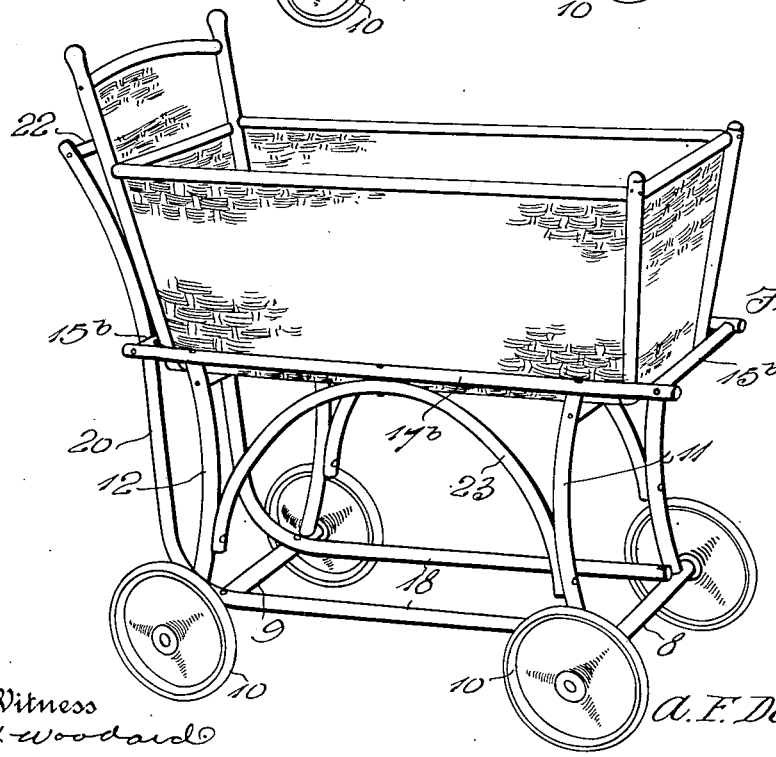
Inventor
A. F. Debelack Patented Dec. 24, 1929

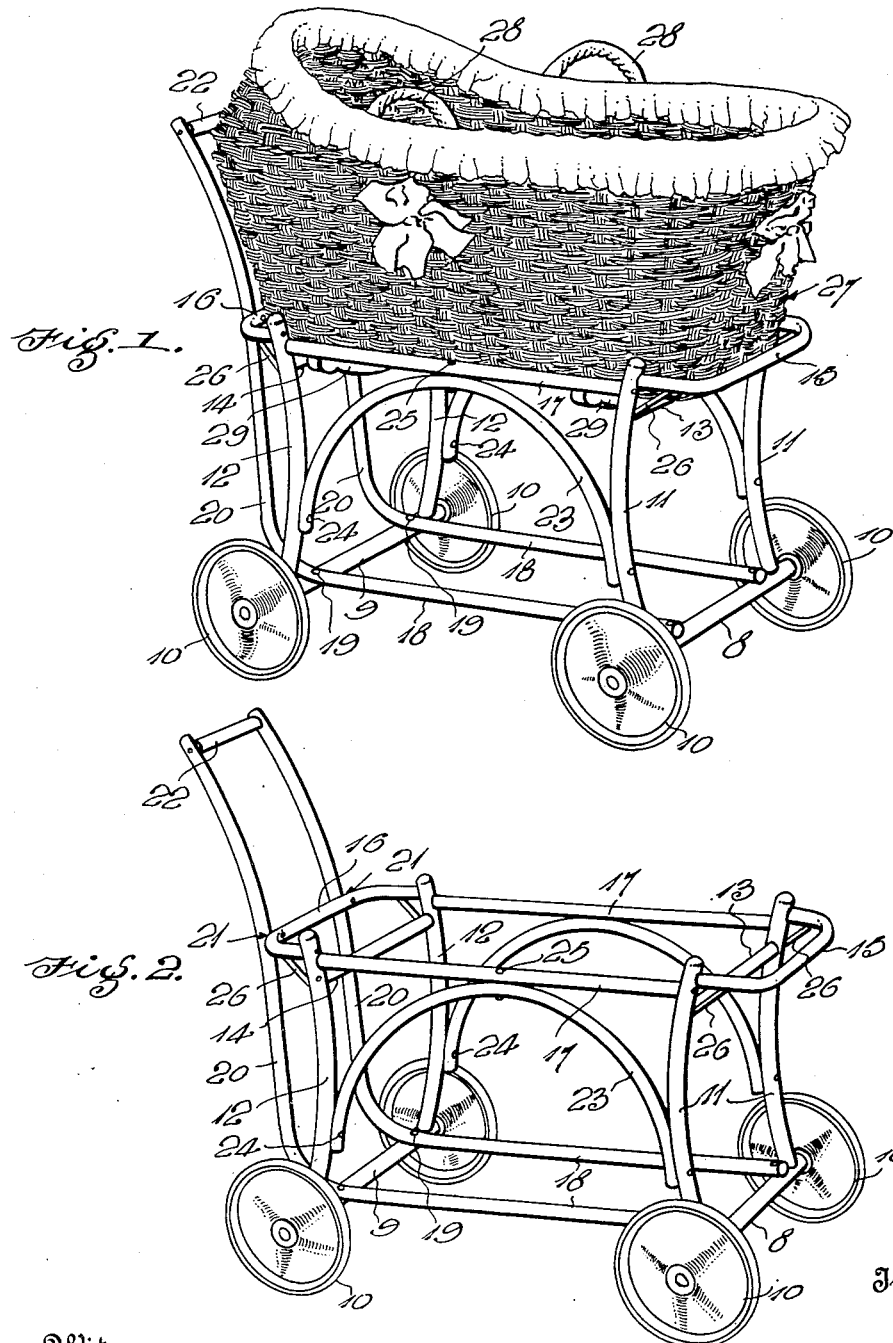

1,741,014

UNITED STATES PATENT OFFICE

ALEXANDER F. DEBELACK, OF SHEBOYGAN, WISCONSIN

BABY CONVEYANCE

Application filed July 2, 1928. Serial No. 289,990.

The invention relates to a new and improved baby conveyance embodying a basket for the infant, and a wheeled frame upon which the basket is removably supported.

It is one object of the invention to provide an exceptionally simple and inexpensive, yet a rigid and durable frame construction, upon which there is no danger of the basket slipping.

A further object of the invention is to provide the basket bottom with rockers permitting use of the basket as a cradle when removed from the frame and to provide such a relation between these rockers and basket-supporting bars of the wheeled frame, as to cause said bars and rockers to hold the basket against longitudinal sliding upon said frame.

With the foregoing in view, the invention resides in the novel subject matter hereinafter described and claimed, description being accomplished by reference to the accompanying drawings.

Fig. 1 is a perspective view showing one form of the invention.

Fig. 2 is a perspective view of the wheeled frame, the basket having been removed.

Fig. 3 is a perspective view showing a different form of wheeled frame and basket.

Fig. 4 is a perspective view showing a still further form of construction.

The form of the invention illustrated in Figs. 1 and 2 will first be described. In these views, the numerals 8 and 9 denote front and rear axles each provided with wheels 10. Two front standards 11 are rigidly secured to and rise from one axle 8 and two rear standards 12 are similarly secured to and rise from the rear axle 9. A straight, basket-supporting bar 13 extends between the upper portions of the standards 11 and at its ends is directly secured to said standards. A similar bar 14 extends between and is directly secured to the upper portions of the standards 12. A U-shaped, forwardly bowed, basket-end-embracing bar or yoke 15 extends between the standards 11 above the bar 13 and has its ends directly secured to said standards, and a rear bar or yoke 16 of the same form, extends between and has its ends directly secured to the standards 12, above the basket-supporting bar 14. Two longitudinal, basket-side-engaging bars 17 extend between the upper ends of the standards 11—12, above the bars 13—14, and have their ends directly secured to said standards. Two additional longitudinal bars 18 extend between the axles 8—9 and are secured thereto by bolts or other suitable fasteners 19. The rear portions 20 of these bars 18 are turned upwardly and rearwardly and at the points 21, cross and are secured to the rear basket-end-embracing bar 16. The bar portions 20 extend above this bar 16 and are secured to a handle-bar 22. Two arched, longitudinally disposed bars 23, have their ends secured by screws or the like 24 to the lower end portions of the standards 11—12, while their crowns are secured by similar fasteners 25 to the centers of the bars 17. Appropriate braces 26 are preferably provided between the longitudinally disposed end portions of the bars 14—15 and the standards 11—12.

Preferably, the axles 8—9, the standards 12 and the various bars above described, are all formed of wood or other suitable material and while in the manufactured article, these wooden bars, with the exception of the axles, are turned to give the effect of fibrous strands for attractive appearance, such turnings have been omitted from the present showing. In securing the standards to the axles, the lower ends of the former are glued or otherwise secured in sockets in said axles. Similarly, in securing the ends of the bars 13—14—15—16—17 to the standards, the latter are formed with sockets in which the bar ends are glued or otherwise secured. The same construction is preferably followed in connecting the handle bar 22 with the upwardly turned bar portions 20.

An appropriately constructed and designed baby basket 27 rests removably upon the bars 13—14 and the sides of said basket engage the bars 17, while its ends are embraced by the front and rear bars 15—16. The basket 27 may well be provided with appropriate handles 28 permitting it to be readily removed from the frame when desired, and in order to allow use of this basket as a cradle when so removed, its bottom is provided with rigidly attached, transverse rockers 29. These rockers are so positioned, that they abut the inner opposed sides of the bars 14—15 and hence hold the basket 27 against longitudinal sliding on the frame. If it be desired to omit the rockers 29, the basket-end-embracing bars 15—16 will prevent appreciable longitudinal sliding of the basket and obviously said basket will be held against lateral shifting, by the bars 17.

The construction of the wheeled frame shown in Fig. 3, is so similar to that above described, that the same reference characters have been applied in most instances. However, there are certain distinctions which will be specifically pointed out. The lower longitudinal bars 18ª, instead of being connected to the front and rear axles 8—9, have their ends directly secured to the lower portions of the standards 11—12, and these bars are not extended to provide any handles for the frame. The basket 27ª however is provided with two pivoted-bail-handles 28ª, and either of these handles may be swung outwardly to an inclined position to provide a handle for pushing and pulling the entire conveyance. This novelty however, is covered by my co-pending U. S. application, Serial No. 289,991, filed on even date herewith.

Other distinctions between the construction of Fig. 3 and that shown by Figs. 1 and 2, are matters of general shape and proportion, the omission of the arched bars 23 and the omission of the rockers 29.

The construction shown in Fig. 4 is analogous in some respects to that illustrated in the preceding figures, the only distinctions being in the construction at the top portion of the frame and in the type of basket shown. In this form of the invention, the longitudinal basket-side-engaging bars 17ᵇ are secured directly upon the upper ends of the standards 11—12 and project forwardly and rearwardly from these standards. Then too, straight transverse bars 15ᵇ extend between and are directly secured to the terminals of the bars 17ᵇ, instead of using the bars 15—16. The bars 15ᵇ and the adjacent ends of the bars 17ᵇ, co-operate in forming forwardly and rearwardly projecting U-shaped yokes directly secured to the standards and serving, like the bars 15—16 to embrace the basket ends.

The features of construction herein disclosed, possess marked advantages such as simplicity and ease of manufacture at minimum cost, durability, rigidity and general efficiency. Then too, they lend themselves admirably to the production of a baby conveyance of unusually unique and pleasing appearance. On account of such advantages, the details disclosed are preferably followed. However, within the scope of the invention as claimed, variations may be made.

I claim:—

1. In a baby conveyance, a basket carriage comprising front and rear wheeled axles, two front standards rising from the front axle, two rear standards rising from the rear axle, a front basket-supporting bar extending between and secured directly to the front standards, a rear basket-supporting bar extending between and secured directly to the rear standards, said bars being downwardly spaced from the upper extremities of said standards, longitudinal basket-side-engaging bars extending between and secured to the upper ends of the front and rear standards, a forwardly extending U-shaped basket-end-engaging yoke extending between and secured directly to the front standards above said front basket-supporting bar, a rearwardly extending U-shaped basket-end-engaging yoke extending between and secured directly to the rear standards above said rear basket-supporting bar, and longitudinal bars holding the lower ends of the front and rear standards against spreading.

2. In a baby conveyance, a basket carriage comprising front and rear wheeled axles, two front standards rising from the front axle, two rear standards rising from the rear axle, a front basket-supporting bar extending between and secured directly to the front standards, a rear basket-supporting bar extending between and secured directly to the rear standards, said bars being downwardly spaced from the upper extremities of said standards, longitudinal basket-side-engaging bars extending between and secured to the upper ends of the front and rear standards, a forwardly extending U-shaped basket-end-engaging yoke extending between and secured directly to the front standards above said front basket-supporting bar, a rearwardly extending U-shaped basket-end-engaging yoke extending between and secured directly to the rear standards above said rear basket-supporting bar, two longitudinal bars extending between and secured to said front and rear axles, the rear portions of these bars being turned upwardly and secured to said rear basket-end-engaging yoke, and a handle bar secured to the upper ends of said upwardly turned bar portions.

3. In a baby conveyance, a basket carriage comprising front and rear wheeled axles, two front standards rising from the front axle, two rear standards rising from the rear axle, a front basket-supporting bar extending between and secured directly to the front standards, a rear basket-supporting bar extending between and secured directly to the rear standards, said bars being downwardly spaced from the upper extremities of said standards, a forwardly bowed basket-end-embracing bar extending between and secured directly to the upper ends of the front standards, a rearwardly bowed basket-end-embracing bar extending between and secured directly to the rear standards, longitudinal basket-side-engaging bars extending between and secured directly to the upper ends of the front and rear standards, and longitudinally disposed bars for holding the lower ends of said front and rear standards against spreading.

4. In a baby conveyance, a basket carriage comprising front and rear wheeled axles, two front standards rising from the front axle, two rear standards rising from the rear axle, a front basket-supporting bar extending between and secured directly to the front standards, a rear basket-supporting bar extending between and secured directly to the rear standards, said bars being downwardly spaced from the upper extremities of said standards, a forwardly bowed basket-end-embracing bar extending between and secured directly to the upper ends of the front standards, a rearwardly bowed basket-end-embracing bar extending between and secured directly to the rear standards, longitudinal basket-side-engaging bars extending between and secured directly to the upper ends of the front and rear standards, longitudinal bars secured to said front and rear axles, the rear portions of these bars being turned upwardly and secured to said rearwardly bowed basket-end-embracing bar, and a handle bar secured to the upper ends of said upwardly turned bar portions.

5. In a baby conveyance, a basket carriage comprising front and rear wheeled axles, two front standards rising from the front axle, two rear standards rising from the rear axle, a front basket-supporting bar extending between and secured directly to the front standards, a rear basket-supporting bar extending between and secured directly to the rear standards, said bars being downwardly spaced from the upper extremities of said standards, a forwardly bowed basket-end-embracing yoke extending between and secured directly to the upper ends of the front standards, a rearwardly bowed basket-end-embracing yoke extending between and secured directly to the rear standards, longitudinal basket-side-engaging bars extending between and secured directly to the upper ends of the front and rear standards, longitudinal bars secured to said front and rear axles, the rear portions of these bars being turned upwardly and secured to said rearwardly bowed basket-end-embracing yoke, a handle bar secured to the upper ends of said upwardly turned bar portions, and two longitudinally disposed arched bars secured at their lower ends to the lower ends of said front and rear standards and secured at their crowns to the centers of said basket-side-engaging bars.

6. A baby conveyance comprising a wheeled frame embodying front and rear laterally spaced standards and basket-supporting bars extending between the upper portions of said standards, a baby basket resting removably on said bars, and transverse rockers secured in fixed invariable positions to the bottom of said basket, said rockers engaging said bars to hold the basket against longitudinal sliding on said frame.

In testimony whereof I have hereunto affixed my signature.

ALEXANDER F. DEBELACK.